United States Patent [19]
Gerber

[11] Patent Number: 4,458,254
[45] Date of Patent: Jul. 3, 1984

[54] LOW INERTIA PLOTTER

[75] Inventor: Heinz J. Gerber, West Hartford, Conn.

[73] Assignee: The Gerber Scientific Instrument Company, South Windsor, Conn.

[21] Appl. No.: 385,714

[22] Filed: Jun. 7, 1982

[51] Int. Cl.³ .............................................. G01G 15/24
[52] U.S. Cl. .................................... 346/134; 346/138; 354/4
[58] Field of Search ............. 346/138, 136, 134, 125, 346/129; 360/136, 100; 354/4

[56] References Cited

U.S. PATENT DOCUMENTS

| | | | |
|---|---|---|---|
| 2,764,464 | 9/1956 | Morton | 346/138 X |
| 3,084,014 | 4/1963 | Molloy | 346/134 X |
| 3,363,260 | 1/1968 | Garbe | 346/129 X |
| 3,372,399 | 3/1968 | Mason | 346/134 X |
| 3,373,414 | 3/1968 | Carter | 360/100 |
| 4,209,239 | 6/1980 | Wood | 354/4 |

Primary Examiner—Joseph W. Hartary
Attorney, Agent, or Firm—McCormick, Paulding and Huber

[57] ABSTRACT

A low inertia plotter having a carrier consisting solely of a relatively thin sheet of support material defining a surface for carrying a sheet of plotting media and supported by an air bearing for movement in one coordinate direction relative to a frame and a plotting instrument supported on the frame for movement in another coordinate direction and in plotting relation to the plotting media. The carrier and the plotting instrument are driven in response to command signals received from a controller.

21 Claims, 7 Drawing Figures

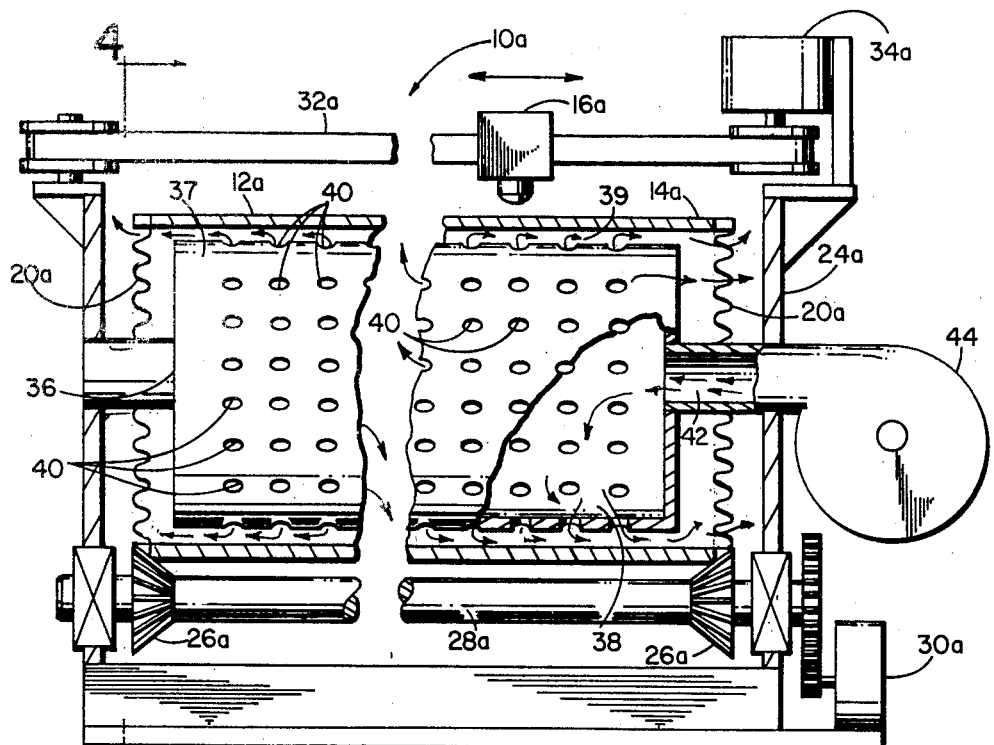
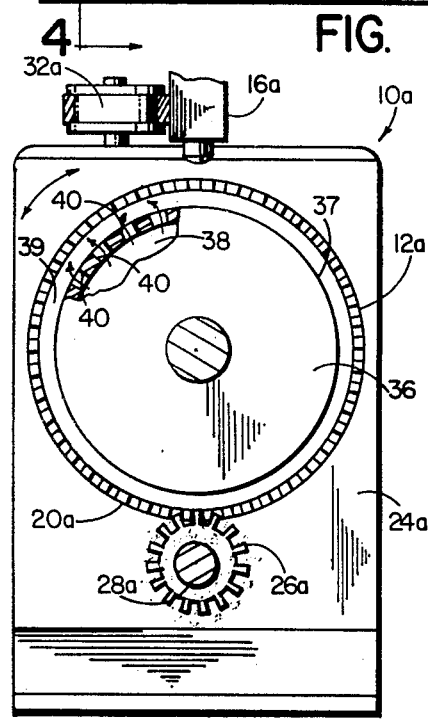
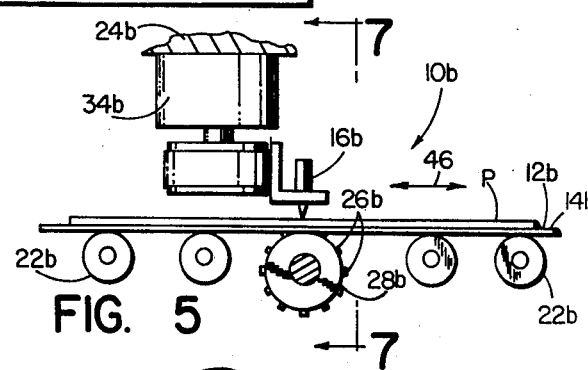
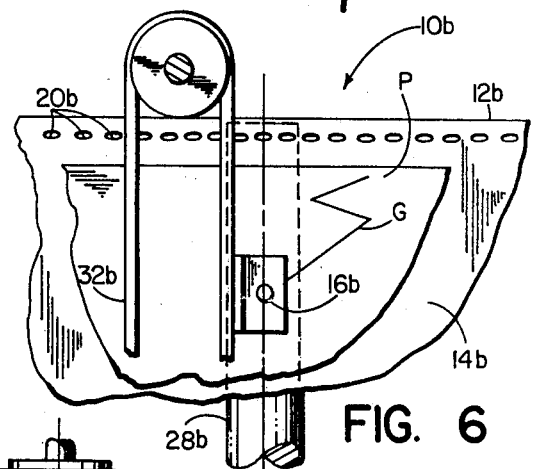
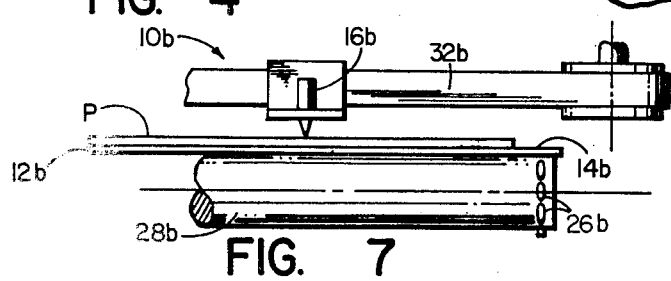

LOW INERTIA PLOTTER

BACKGROUND OF THE INVENTION

This invention relates in general to plotting apparatus and deals more particularly with improvements in plotters of the type wherein a movable carrier, which carries a plotting sheet, and a plotting instrument, supported to move in plotting relation to the plotting sheet, are or may be simultaneously driven in different coordinate directions to generate a graphic plot on the plotting sheet in response to command signals received from a controller. In a plotter of the aforedescribed general type, the movable carrier and the plotting instrument may accelerate, decelerate and change directional sense many times during the generation of a single graphic plot. The accuracy of the apparatus and the speed at which it is capable of operating is determined, to a large degree, by the inertia of its moving parts. The movable carrier which defines the plotting surface usually has a mass considerably greater than the mass of the plotting instrument and, therefore, generally determines the maximum speed at which the plotter may be operated to produce an accurate graphic plot.

It is the general aim of the present invention to provide an improved graphic plotter of the aforedescribed general type.

SUMMARY OF THE INVENTION

In accordance with the invention, a low inertia plotter comprises a frame, a plotting instrument carried by the frame, and a carrier having a surface for carrying a sheet of plotting media and consisting solely of a relatively thin sheet of material. A means is provided for supporting the carrier for movement relative to the frame to effect movement of the carrier in one coordinate direction relative to the plotting instrument. A means is also provided for supporting the plotting instrument for movement relative to the frame to effect movement of plotting instrument in another coordinate direction relative to the carrier and in plotting relation to a sheet of plotting media supported by the carrier surface. The plotter further includes means for driving the carrier in the one coordinate direction and means for driving the plotting instrument in the other coordinate direction.

BRIEF DESCRIPTION OF THE DRAWINGS

FIG. 3 is similar to FIG. 2, but shows another plotter embodying the invention.

FIG. 4 is a sectional view taken generally along the line 4—4 of FIG. 3.

FIG. 5 is a somewhat schematic fragmentary side elevational view showing still another plotter embodying the invention.

FIG. 6 is a fragmentary plan view of the plotter shown in FIG. 5.

FIG. 7 is a fragmentary sectional view taken along the line 7—7 of FIG. 5.

DETAILED DESCRIPTION OF PREFERRED EMBODIMENTS

Figure 1:
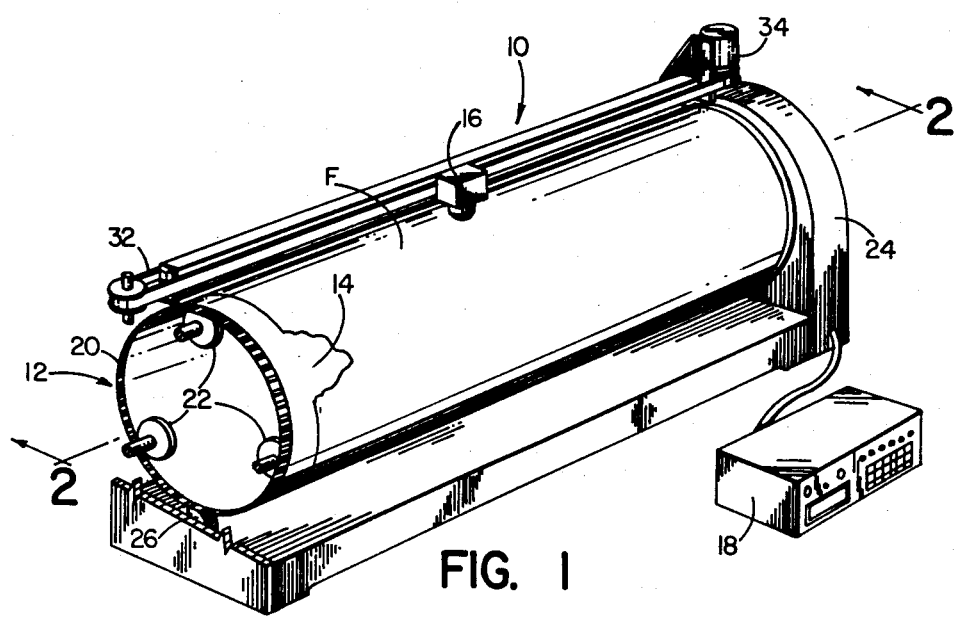
FIG. 1 is a fragmentary perspective view of the drum plotter embodying the present invention.

Turning now to the drawings, and referring first particularly to FIGS. 1 and 2, the invention is illustrated with reference to a drum plotter indicated generally by the reference numeral 10. The plotter 10 is particularly adapted to generate a graphic plot on a sheet of plotting media and includes a carrier or drum, indicated generally at 12, which has a cylindrical surface 14 for carrying the plotting media. The drum 12 is supported for rotation in one coordinate direction about its axis to more relative to a plotting instrument 16.

The plotting instrument may take various forms and may, for example, be an instrument of a type which applies material directly to a plotting media, as, for example, an ink jet printing device, however, the illustrated plotting instrument 16 comprises a photohead, which includes a light source for photographically exposing a photosensitive plotting media such as a photographic film, designated by the letter F. The photohead 16 may operate intermittently to project spots of light or may be continuously illuminated to project a beam of light onto the photosensitive film F.

The drum 12 and plotting head 16 are driven in response to command signals received from a controller 18. Composite movements of the drum 12 and the photohead 16, which may move simultaneously relative to each other, coupled with operation of the photohead expose a graphic plot (not shown) on the photosensitive film F, which is supported by the drum to move in the one coordinate direction as the drum moves in the latter direction. In the illustrated embodiment 10, the film F is preferably secured to the drum surface 14 by tape, pressure sensitive adhesive or other suitable means.

Considering the plotter 10 in further detail, the drum 12 preferably consists wholly of a relatively thin sheet of support material which comprises a cylindrical drum shell, substantially as shown. The illustrated drum shell is peripherally supported near its opposite ends on a supporting structure or frame 24 by a plurality of lightweight rollers 22, 22 mounted on the frame. The rollers engage the inner periphery of the cylindrical drum shell to support it for rotation about its axis.

Figure 2:
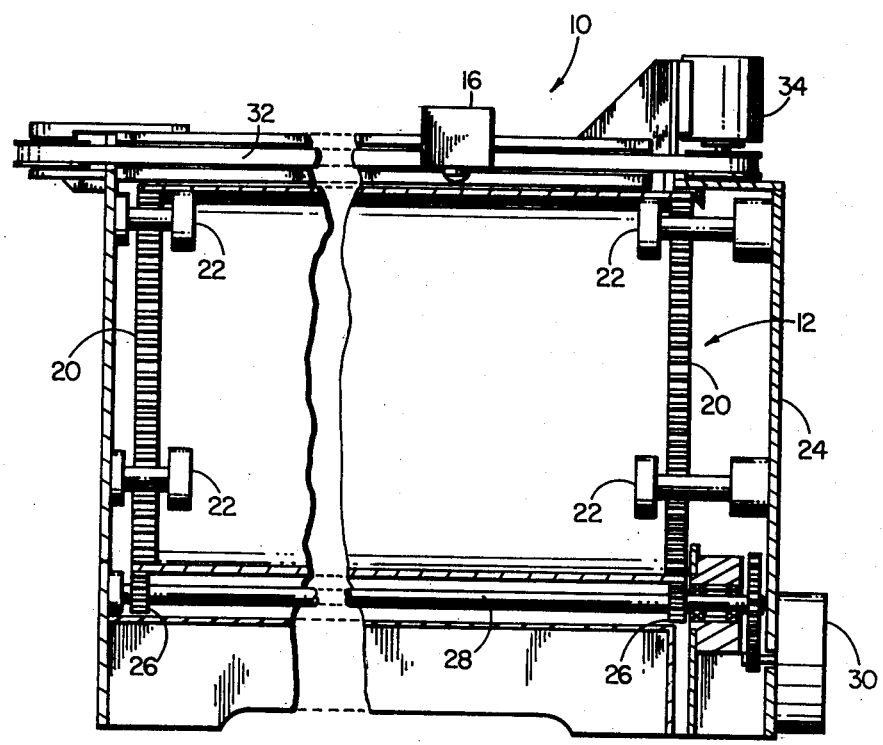
FIG. 2 is a somewhat enlarged fragmentary sectional view taken along the line 2—2 of FIG. 1.

The illustrated drum 12 is driven by drive teeth 20, 20 located at opposite ends of the drum shell, as shown in FIG. 2. The drive teeth may, for example, comprise the teeth of ring gears made from relatively lightweight material and attached to the ends of the thin walled drum shell, but preferably, and as shown, the teeth 20, 20 are formed by the sheet material from which the hollow shell is made and comprise an integral part of the drum 12.

Pinions 26, 26, meshingly engaged with the drive teeth 20, 20 and mounted on a common drive shaft 28 coupled to a reversible, variable speed drive motor 30, rotate the drum 12 in one or an opposite direction in response to electrical signals received from the controller 18.

The illustrated photohead 16 is of conventional type and is supported on the frame 24 above the drum 12 to move parallel to the axis of the drum in spaced relation to the surface 14. The photohead is connected to a drive belt 32 supported by pulleys carried by the frame 24. One of the pulleys is driven by another reversible, variable speed drive motor 34 mounted on the frame 24. The motor 34 also operates in response to electrical command signals received from the controller 18 to positively position the photohead 16.

In FIGS. 3 and 4 there is shown another plotter 10a which also embodies the present invention. The illustrated plotter 10a is similar in some respects to the previously described plotter 10, but differs from it, primarily in the manner in which its carrier or plotting drum is supported for rotation. Specifically, the plotting drum, indicated at 12a, is supported by an air bearing for rotation about its axis in response to command signals from a controller (not shown). The cylindrical drum 12a consists solely of a thin sheet of support material, such as metal, and has an annular series of drive teeth 20a, 20a which are preferably integrally formed along each of its end marginal portions. The drive teeth 20a, 20a may, for example, be stamped into the support material before it is formed into a cylindrical drum shell. Support for the drum 12a is provided by an air bearing means which may take various forms and in the illustrated case comprises a hollow stationary member 36 supported by the frame 24, having a cylindrical bearing surface 37, and defining a pressure chamber 38. The stationary member 36 has an outside diameter slightly smaller than the inside diameter of the drum 12a, providing an annular space 39 between the stationary member 36 and the drum 12. For the purpose of illustration, the size of the annular space 39 is exaggerated in FIGS. 3 and 4. In actuality the space 39 is preferably in the order of a few thousands of an inch in radial dimension. Air passageways 40, 40 extend through the cylindrical wall of the member 36 and communicate between the chamber 38 and the space 39. Air under pressure is supplied to the chamber 38 through a supply duct 42 which communicates with an air supply source, such as the blower 44 shown in FIG. 3.

The illustrated drum 12a is driven by bevel gears 26a, 26a which mesh with the drive teeth 20a, 20a formed on the drum 12a. The bevel gears are mounted on a common drive shaft 28a coupled to a reversible, variable speed drive motor 30a which receives command signals from a controller, such as the controller 18 shown in FIG. 1. If necessary, suitable means may be provided to maintain the drum in general coaxial relation to the support member 36. As in the previously described embodiment, the plotting instrument comprises a photohead 16a supported on the frame 24a to move in one coordinate direction parallel to the axis of the drum 12a. The photohead 16a is driven by another reversible, variable speed drive motor 34a which also receives command signals from the controller.

Air delivered to the chamber 38 by the blower 44 flows outwardly through the air passageways 40, 40 into and along the space 39 between the outer cylindrical surface of the stationary member 36 and the inner cylindrical surface of the drum 12a and escapes at the opposite ends of the drum. In this manner, an air bearing is provided in the space 39 between the inner peripheral surface of the drum 12a and the bearing surface 37, so that the drum 12a is supported for substantially frictionless rotation in spaced relation to the stationary member 36 by a moving film of air. Operation of the drive motor 30a rotates the drum in one coordinate direction about its axis. The photohead 16a moves in another coordinate direction in response to command signals received from the controller to generate a graphic plot (not shown) on photosensitive paper carried by the drum surface 14a. The drum and the photohead may move sequentially or simultaneously to generate a plot in response to the command signals from the controller.

In the plotters hereinbefore described, the plotting instrument comprises a photohead which does not contact the plotting media during the plotting cycle. However, the plotting instrument may also be one, such as a stylus, pen or pencil, which engages the plotting sheet to generate a plot. In such case it may be desirable to provide some back-up support for the thin material of the drum or other member which defines the plotting material carrying surface, in at least the region of the plotting station. Such apparatus is illustrated in FIGS. 5, 6 and 7 and indicated generally by the reference numeral 10b.

The illustrated apparatus 10b includes a carrier 12b, which has a surface 14b and consists solely of a relatively thin, flat sheet of material. A series of drive apertures 20b, 20b are formed in the opposite marginal potions of the material 12b, substantially as shown. A drive shaft 28b disposed below the plotting surface 14b extends transversely of the material 12b in engagement with the lower surface of the material and carries angularly spaced cogs 26b, 26b which drivingly engage the drive apertures 20b, 20b. Additional lightweight rollers 22b, 22b further support the movable material 12b, substantially as shown. A drive shaft 28b coupled to a reversible, variable speed drive motor 30b moves the support material 12b in a longitudinal coordinate direction, as indicated by the directional arrow 46 in FIG. 5, in response to command signals received from a controller similar to the controller 18, but not shown.

The plotting instrument comprises a stylus 16b connected to a belt 32b supported on a frame 24b by pulleys (one shown) and driven by a reversible, variable speed drive motor 34b. The motor receives command signals from the controller to move the stylus 16b in a transverse coordinate direction and parallel to the axis of the drive shaft 28b and relative to the material 12b with the stylus 16b in plotting engagement with a sheet of plotting media or paper P carried by the material to generate a graphic plot, indicated by the letter G, on the movable paper P. The drive shaft 28b functions both to drive the material 12b and to provide backup support for it in the plotting region immediately below the stylus 16b.

While the illustrated sheet 12b is supported, at least in part by rollers 22b, 22b, it should be apparent from the foregoing disclosure that air bearing means may be utilized to support the flat sheet 12b, and such arrangement is contemplated within the scope of the invention.

I claim:

1. A low inertia plotter comprising a frame, a plotting instrument carried by said frame, a carrier having a surface for carrying a sheet of plotting media and consisting solely of a relatively thin sheet of material, carrier supporting means peripherally supporting said carrier for movement relative to said frame to effect movement of said carrier in one coordinate direction relative to said plotting instrument, drive means for driving said carrier in said one coordinate direction, means supporting said plotting instrument for movement relative to said frame to effect movement of said plotting instrument in another coordinate direction relative to said carrier and in plotting relation to a sheet of plotting media carried by said surface, and drive means for driving said plotting instrument in said other coordinate direction.

2. A low inertia plotter as set forth in claim 1 wherein said carrier supporting means comprises a plurality of rollers.

3. A low inertia plotter as set forth in claim 1 wherein said carrier supporting means comprises an air bearing.

4. A low inertia plotter as set forth in claim 3 wherein said carrier supporting means includes means defining a bearing surface in close proximity to an associated surface of said carrier and means for maintaining a continuous flow of air under pressure through the space between said bearing surface and said associated surface.

5. A low inertia plotter as set forth in any one of claims 1, 2, 3 and 4 wherein said carrier comprises a substantially flat sheet of said material and said surface is substantially flat.

6. A low inertia plotter as set forth in any one of claims 1, 2, 3 and 4 wherein said carrier comprises a cylindrical sheet and said surface is substantially cylindrical.

7. A low inertia plotter as set forth in claim 6 wherein said carrier supporting means comprises a stationary member having a wall defining said bearing surface and including a pressure chamber and air passageways extending through said wall and communicating with said pressure chamber.

8. A low inertia plotter as set forth in claim 7 wherein said bearing surface comprises a cylindrical bearing surface disposed within said carrier.

9. A low inertia plotter as set forth in claim 8 wherein said means for maintaining said flow of air comprises means for supplying air to said pressure chamber.

10. A low inertia plotter as set forth in claim 9 wherein said means for supplying air comprises a blower.

11. A low inertia plotter as set forth in any one of claim 1, 2, 3 and 4 wherein said carrier drive means comprises an integral portion of said carrier.

12. A lower inertia plotter as set forth in claim 1 wherein said carrier drive means includes a series of drive teeth integrally formed on said material.

13. A low inertia plotter as set forth in claim 12 wherein said drive teeth are formed on a marginal portion of said material.

14. A low inertia plotter as set forth in any one of claims 1, 2, 3 and 4 wherein said plotter includes back-up means for supporting said material in the region of movement of said plotting instrument as said plotting instrument moves relative to said carrier.

15. A low inertia plotter as set forth in claim 14 wherein said carrier drive means comprises said back up means.

16. A low inertia plotter as set forth in claim 15 wherein said carrier drive means includes a drive shaft disposed in engagement with an associated surface of said material.

17. A low inertia plotter comprising a frame, a plotting instrument carried by said frame, a carrier having a surface for carrying a sheet of plotting media and consisting solely of a relatively thin sheet of material, air bearing means peripherally supporting said carrier for movement relative to said frame to effect movement of said carrier in one coordinate direction relative to said plotting instrument and including a stationary member having a pressure chamber and including a wall defining a bearing surface in close proximity to an associated surface of said carrier and having air passageways therethrough communicating with said pressure chamber for maintaining a continuous flow of air under pressure from said pressure chamber through the space between said bearing surface and said associated surface, drive means for driving said carrier in said one coordinate direction, means supporting said plotting instrument for movement relative to said frame to effect movement of said plotting instrument in another coordinate direction relative to said carrier and in plotting relation to a sheet of plotting media carried by said surface, and drive means for driving said plotting instrument in said other coordinate direction.

18. A low inertia plotter as set forth in claim 17 wherein said carrier comprises a cylindrical sheet and bearing surface comprises a cylindrical bearing surface disposed within said carrier.

19. A low inertia plotter as set forth in claim 18 wherein said means for maintaining said flow of air comprises means for supplying air to said pressure chamber.

20. A lower inertia plotter as set forth in claim 19 wherein said means for supplying air comprises a blower.

21. A low inertia plotter comprising a frame, a plotting instrument carried by said frame, a carrier having a surface for carrying a sheet of plotting media and consisting solely of a relatively thin cylindrical shell open at its opposite ends, means peripherally supporting said carrier for movement relative to said frame to effect movement of said carrier in one coordinate direction relative to said plotting instrument carrier, drive means associated with the periphery of said carrier for driving said carrier in said one coordinate direction, means supporting said plotting instrument for movement relative to said frame to effect movement of said plotting instrument in another coordinate direction relative to said carrier and in plotting relation to a sheet of plotting media carried by said surface, and instrument drive means for driving said plotting instrument in said other coordinate direction.

* * * * *